(No Model.)
M. B. MARSHALL.
ANIMAL TRAP.
No. 322,736. Patented July 21, 1885.
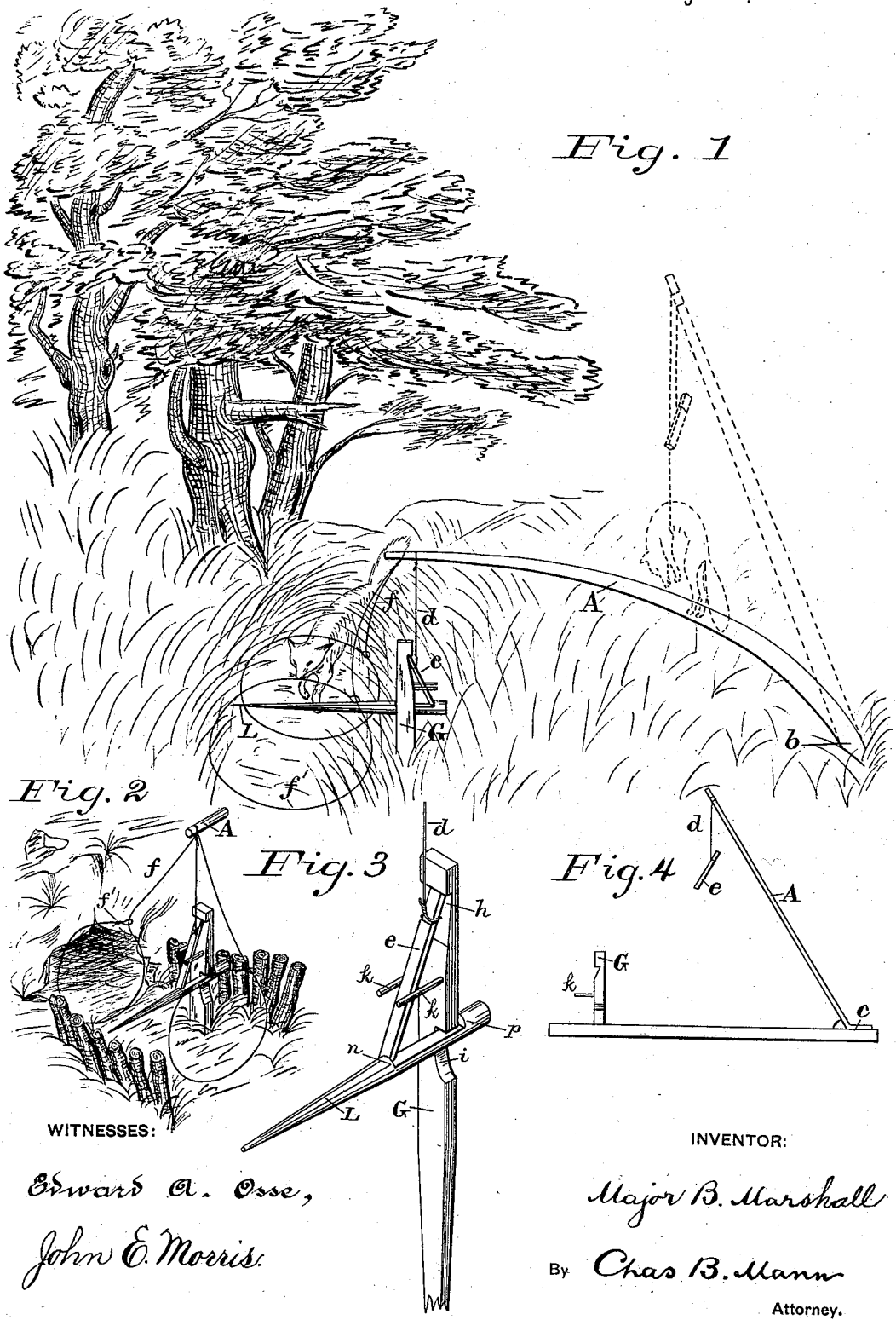
WITNESSES:
Edward A. Osse,
John E. Morris.
INVENTOR:
Major B. Marshall
By Chas B. Mann
Attorney.

United States Patent Office.

MAJOR B. MARSHALL, OF VIENNA, MARYLAND.

ANIMAL-TRAP.

SPECIFICATION forming part of Letters Patent No. 322,736, dated July 21, 1885.

Application filed September 25, 1884. (No model.)

*To all whom it may concern:*

Be it known that I, MAJOR B. MARSHALL, a citizen of the United States, residing at Vienna, in the county of Dorchester and State of Maryland, have invented certain new and useful Improvements in Animal-Traps, of which the following is a specification.

My invention relates to an improved trap for catching animals, such as foxes, raccoons, hares, muskrats, and burrowing animals of all kinds.

The invention consists of certain improved features of construction in that class of traps for which Letters Patent for an improvement were granted me March 10, 1868.

The trap will first be described, and the combination of features which constitute the invention will then be designated in the claim.

Figure 1 is a view of the trap and an animal about to spring it, and indicates by broken lines how the animal is raised bodily. Fig. 2 is another view of the trap, showing it in a different position. Fig. 3 is a view on a larger scale, showing the trigger mechanism. Fig. 4 is a view of the trap constructed in a portable form.

The letter A designates a spring-bar of any suitable kind, wood or metal. One end of this bar is fixed either in the ground, as at $b$, or to some suitable support, as at $c$. In its normal position the spring-bar is upright or a little inclined; but it should have such elasticity as will allow it to be bent down when the trap is to be set, as in Fig. 1. The free end of the spring-bar has attached a short wire or cord, $d$, carrying a brace-rod, $e$, by which, as hereinafter described, the spring-bar is held down. The free end also has one or more cords or wires, $f$, each having a slip-noose, $f'$. A stake, G, is fixed upright either in the ground or to some suitable support. This stake has a notch, $h$, near its upper end, and may have another notch, $i$, lower down, though this latter notch is not absolutely essential. The stake also has on the same side with the upper notch two laterally-projecting pins, $k$, which are separated far enough apart to permit the brace-rod $e$ to have position between them. A trigger, L, consists of a stiff arm provided with two notches or shoulders, $n$ and $p$. When the trap is set, the trigger-arm has position crosswise of the stake G, as shown, and one of the notches or shoulders, either $n$ or $p$, bears against the side of the stake; also, by preference, the trigger-arm occupies the lower notch, $i$, on the stake. The brace-rod $e$ is placed between the two pins $k$, and has one end set in the upper notch, $h$, of the stake, and the other end in one of the notches or bearing against one of the shoulders, $n$ or $p$, of the trigger-arm. The two laterally-projecting pins enable the brace-rod and trigger-arm to be set without any difficulty, and obviate the necessity for repeated efforts. It will be seen that the tension of the spring-bar A draws the wire or cord $d$, which pulls the brace-rod $e$, and thereby the trigger-arm L is kept in position. On the other hand, the trigger-arm and upper notch, $h$, together hold the brace-rod, and thereby the spring-bar A is held down. The trap must of course be set in a suitable place—for instance, close by a hole in the ground where the animal will pass in or out. The slip-noose, of which I prefer to use two, are stretched or opened ring shape, and placed upright on the ground near the hole or in the hole or burrow and in close position to the projecting trigger-arm L. The best way is to have one slip-noose on each side of the trigger-arm, as shown. The animal in approaching the hole or coming from the hole, will pass through one of the stretched nooses, and will come in contact with the trigger-arm L, the least disturbance of which will release the brace-rod $e$, and thereby instantly spring the bar A, whereupon the noose will be tightened about the animal and the latter raised from the ground and suspended, as indicated by broken lines in Fig. 1. When thus caught and suspended clear of the ground the animal has no foothold. It is therefore impossible for it to free itself by writhing.

Having described my invention, I claim and desire to secure by Letters Patent of the United States—

An animal-trap having in combination a stake, G, provided near its upper end with a notch, $h$, and on the same side with said notch two laterally-projecting pins, $k$, a trigger-arm, L, provided with two notches or shoulders, $n$ and $p$, a brace-rod, $e$, placed between the two lateral pins, and having one end set in the said notch of the stake and the other end in one of the notches or shoulders on the trigger-arm, a spring-bar, a wire or
5 cord, *d*, connecting the brace-rod and spring-bar, and a slip-noose attached to the spring-bar, as set forth.

In testimony whereof I affix my signature in presence of two witnesses.

MAJOR B. MARSHALL.

Witnesses:
WM. B. NELSON,
JNO. T. MADDOX.